Aug. 6, 1957  A. A. GORSKI  2,802,181
SIGNAL AMPLITUDE MEASURING SYSTEM
Filed July 30, 1952  2 Sheets-Sheet 1

INVENTOR.
ALEXANDER A. GORSKI
BY
Brown, Denk & Lynnestvedt
AGENTS

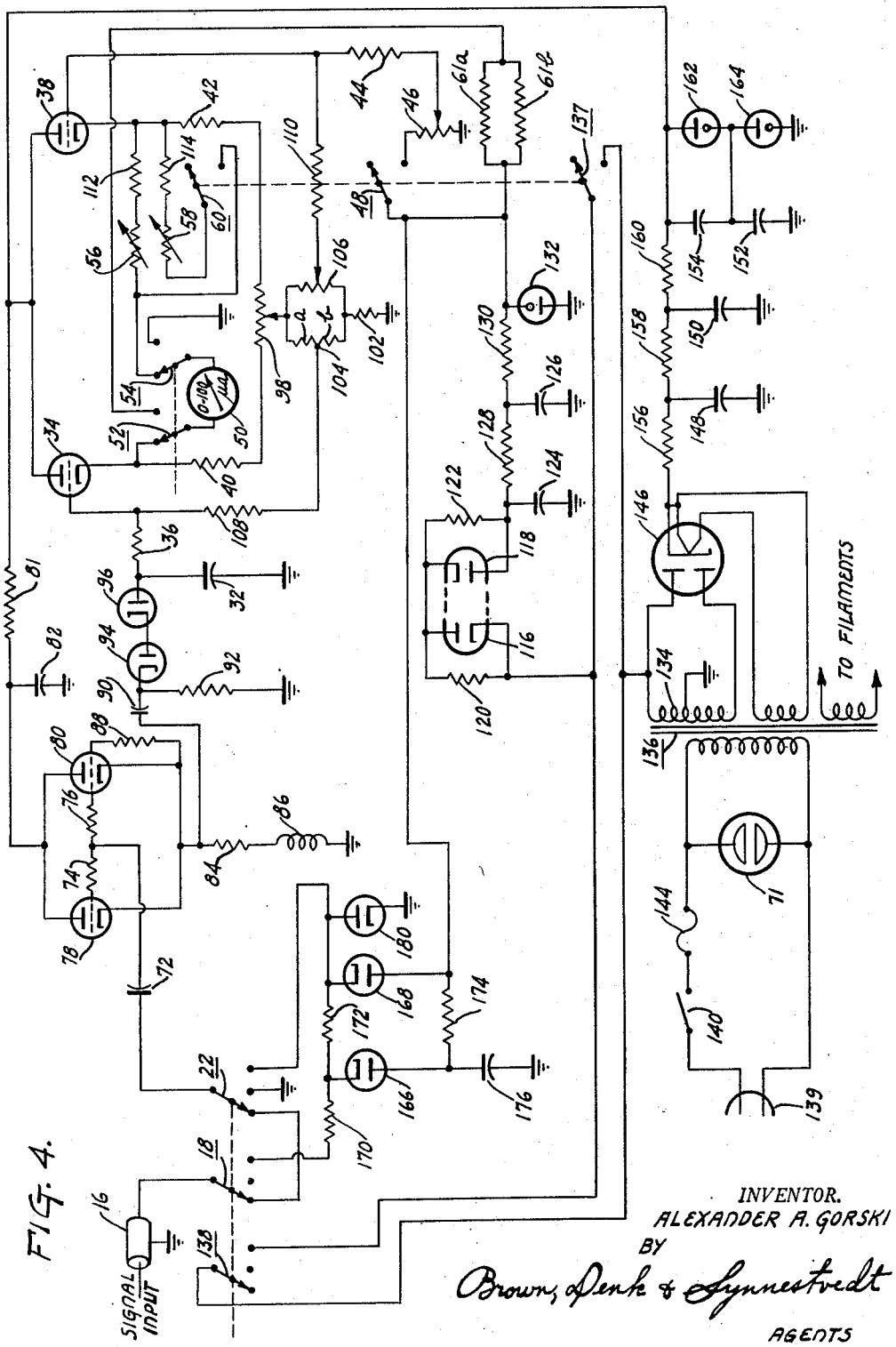

United States Patent Office 2,802,181
Patented Aug. 6, 1957

2,802,181

SIGNAL AMPLITUDE MEASURING SYSTEM

Alexander A. Gorski, Palmyra, N. J., assignor to Philco Corporation, Philadelphia, Pa., a corporation of Pennsylvania Application July 30, 1952, Serial No. 302,702

16 Claims. (Cl. 324—98)

This invention relates to measuring devices and more particularly to a method of and means for accurately measuring the amplitude of short-duration voltage pulses. Prior to the conception of the present invention amplitude measurement of voltage pulses of the order of a few microseconds or less in time duration was difficult, time consuming and of doubtful accuracy. Such measurements were usually made by applying the pulses to be measured to one set of deflection plates of a cathode-ray oscilloscope and noting the deflection caused thereby. A rough measure of the pulse amplitude could then be computed from the known deflection sensitivity of the oscilloscope. If a more accurate determination was required, the usual procedure was to apply a pulse from a laboratory standard pulse source to the oscilloscope and to note the amplitude of this pulse by counting the divisions intercepted on a superimposed scale or by some similar technique. A more accurate determination of the amplitude of the pulse to be measured could then be obtained by taking the ratio of the deflections produced by the two pulses. Even this latter and presumably more accurate method of measuring pulse amplitude is open to many objections. The amplitude of the laboratory standard pulse may not be accurately known or this amplitude may shift with changes in time or temperature. The response of the oscilloscope to the standard pulse may be quite different from that of the pulse to be measured, particularly if the waveshapes of the two pulses are materially different. Therefore the reading taken will have very little significance unless the equipment employed in taking the measurement is carefully identified and the same equipment used each time a measurement is to be made. This method of measuring pulse amplitudes is subject to the further disadvantage that two readings must be taken and the readings compared. Therefore the chances for errors in reading are at least doubled. The difficulties encountered in obtaining an accurate measurement are multiplied by the fact that the conventional cathode-ray oscilloscope is generally provided with a rather crude scale spaced a considerable distance from the phosphor screen.

Previous attempts to construct direct reading meters to measure pulse amplitudes have generally failed because the impedance of the input circuit was too low and/or the rate of response of the meter to short duration pulses was too slow. These shortcomings were particularly noticeable where the amplitude of one or two microsecond negative pulses of high amplitude were to be measured. In many instances it is highly advantageous to employ a capacitive voltage divider to reduce the amplitude of the pulse to be measured to some low value, say below 100 volts. The input impedance of the meter placed across one branch of the voltage divider must be very high if the known ratio of the voltage divider is to remain undisturbed. This high input impedance must be achieved without the use of a high resistance since the time constant of the meter must be kept as short as possible. In meters for measuring negative pulses it was thought that a cathode follower could not be used because of the low grid-cathode bias and the necessarily low cathode load impedance required by the meter.

Even if the prior art meters were to overcome the disadvantages noted above, they still would be subject to the very serious objection that they provide no means for self calibration. Any meter not provided with an internal calibrating circuit may be calibrated against a standard pulse source but this is generally unsatisfactory since the amplitude of the standard pulse may vary with time and for the further reason that a direct reading meter is even more dependent on pulse shape in its response than is an oscilloscope. Therefore direct reading meters usually are calibrated by measuring the unknown pulse both on an oscilloscope and on the meter and then applying a standard pulse to the oscilloscope to determine the amplitude of the unknown pulse. The method possesses all of the difficulties of and requires all of the equipment employed in the oscilloscope method of measuring pulses plus an additional measuring and comparison step that can introduce error. These and other disadvantages well known to workers in this art have combined to render all prior pulse measuring devices somewhat less than satisfactory.

Therefore it is an object of the present invention to provide a novel and successful direct reading meter for measuring the amplitude of short-duration voltage pulses.

It is a further object of the present invention to provide a novel direct reading meter for measuring the amplitude of short-duration voltage pulses, which has a high input impedance and a fast response time.

Another object of the present invention is to provide an internally calibrated meter for measuring the amplitude of short-duration voltage pulses.

Still another object of the present invention is to provide a novel method of and means for calibrating pulse amplitude measuring devices.

A further object of the present invention is to provide a meter which incorporates a novel scale expanding circuit.

These and other objects of the present invention are achieved by providing a meter having a novel cathode follower type input circuit which has both a high input impedance and a short time constant. The meter circuit is further provided with a calibrating voltage source and means for alternatively and selectively placing the indicator in circuit with said source to measure the amplitude of the potential supplied thereby or in circuit with a source of reference standard pulses provided by clipping the input pulses to be measured at the level of said calibrating voltage source. Means are provided for increasing the sensitivity of the meter and simultaneously balancing out a selected pulse input level, thereby to provide an expanded presentation of a selectable portion of the meter range. The construction and arrangement of the meter circuit is such that it may be accurately calibrated without resort to external power supplies or standard pulse sources.

For a better understanding of the invention, together with other and further objects thereof, reference should now be made to the following detailed description which is to be read in connection with the accompanying drawings, in which:

Fig. 4 is a complete wiring diagram of one preferred embodiment of the present invention.

Figure 1:
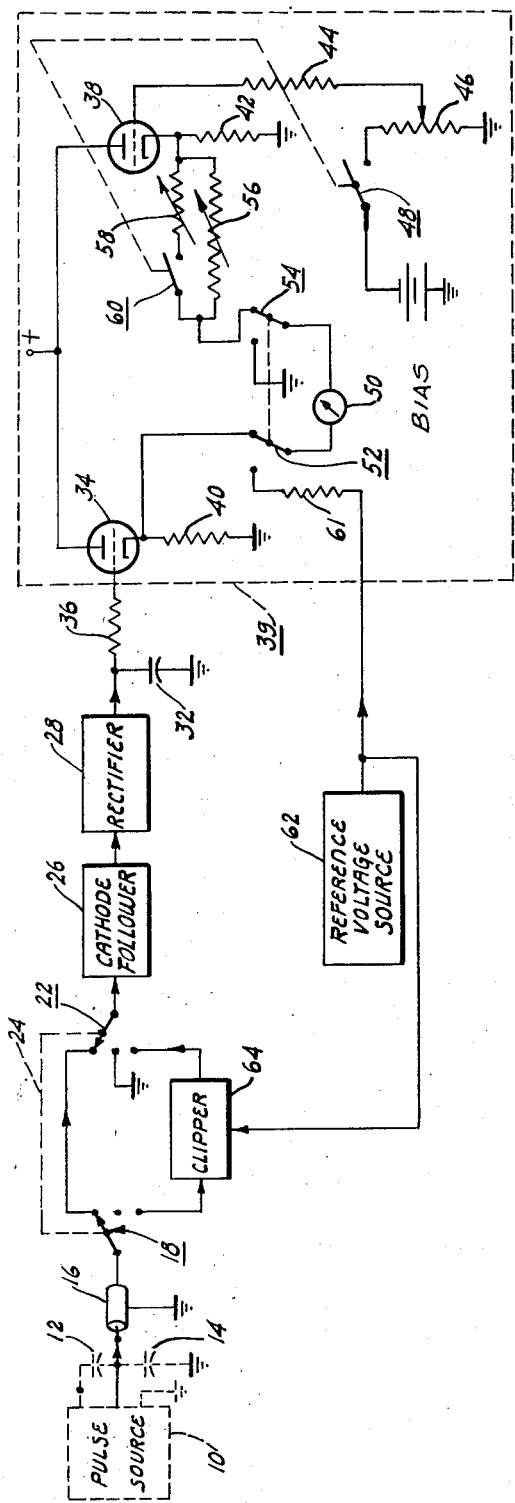
Fig. 1 is a schematic diagram partially in block form of one preferred embodiment of the invention.
Figure 2:
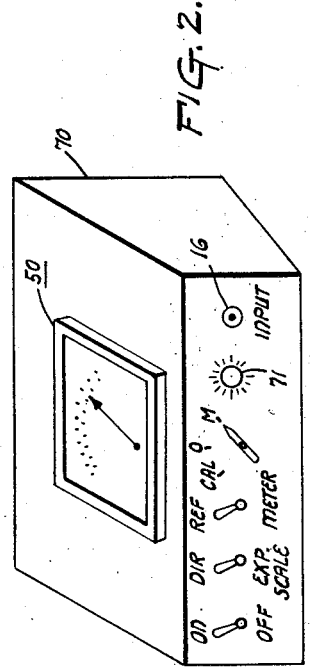
Fig. 2 is a pictorial sketch of a possible physical embodiment of the circuit of Fig. 1.
Figure 3:
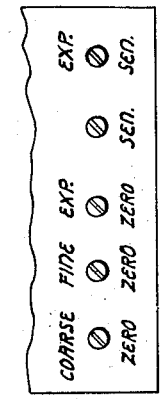
Fig. 3 is a fragmentary view of a second portion of the embodiment of Fig. 2.

Figs. 1 through 4 should be considered together in connection with the reading of the following description since Figs. 1, 2 and 3, although somewhat less detailed than Fig. 4, are nevertheless in complete correspondence with the showing of Fig. 4. However, it is believed that the broader aspects of the invention may be more easily understood and the possible modifications and changes that may be made in the specific circuits later to be described may be more fully appreciated by first considering the block diagram of Fig. 1 and the pictorial sketches of Figs. 2 and 3.

In Fig. 1 the source of pulses to be measured is represented by the block 10. Connected to the output of pulse source 10 is a capactive voltage divider composed of capacitors 12 and 14. Capacitors 12 and 14 and pulse source 10 have been shown in broken lines since they do not form an integral part of the present invention. The junction of capacitors 12 and 14 is connected to input terminals 16 which may take the form of a coaxial jack as shown in Fig. 1. The outer terminal of the coaxial jack is maintained at ground potential in accordance with conventional engineering practice. The inner terminal of the coaxial jack is connected to the contact arm of a three-position switch 18. Switch 18 is placed in the position shown in Fig. 1 to measure the amplitude of applied pulses. In the position shown, the upper contact of switch 18 is connected to the upper contact of a second three-position switch 22. Switches 18 and 22 are mechanically ganged as indicated by dashed line 24 to cause them to operate in synchronism. In practice switches 18 and 22 may be separate decks on a multi-deck wafer switch or they may be combined as part of a multi-pole, three-position switch. The contact arm of switch 22 is electrically connected to the input of a cathode follower 26. Therefore, with switches 18 and 22 in the position shown in Fig. 1, a signal obtained from the capacitive voltage divider is applied directly to the input of the cathode follower 26. If positive pulses only are to be measured, cathode follower 26 may be of fairly conventional design with the electron tube forming a part of the circuit biased approximately at plate current cut-off. However, if negative pulses are to be measured, the cathode follower 26 preferably is constructed and arranged in a manner equivalent to the circuit shown in detail in Fig. 4 which will be described later. The function of cathode follower 26 is to provide a high impedance, short time constant input circuit for the meter of Fig. 1.

The output of cathode follower 26 is applied through a rectifier 28 to capacitor 32. The charging time constant through rectifier 28 and capacitor 32 is short compared to the duration of the pulses to be measured. The ungrounded terminal of capacitor 32 is connected to the control grid of an electron tube 34 through a resistor 36. Resistor 36 preferably has a resistance of several megohms in order that the discharge time constant of capacitor 32 and resistor 36 is long compared to the interval between successive pulses. Rectifier 28, capacitor 32 and resistor 36 act as a peak detector to charge capacitor 32 to a potential equal to the peak amplitude of the pulses to be measured and to maintain this charge for a sufficient length of time to permit an accurate meter reading to be taken.

Electron tube 34 and a second electron tube 38 form the active elements of a balanced D.-C. amplifier circuit generally outlined by the broken line 39. This balanced D.-C. amplifier circuit is completed by returning the anodes of electron tubes 34 and 38 to a suitable source of fixed positive potential represented by the plus (+) sign in Fig. 1. The cathodes of tubes 34 and 38 are returned to ground through substantially identical resistors 40 and 42. The grid of electron tube 38 is returned to ground through an isolating resistor 44 and an adjustable potentiometer 46. Resistor 44 is joined to the movable tap of potentiometer 46 in order to permit adjustment of the bias supplied to the grid of electron tube 38 when switch 48 is closed. Switch 48 is a two-position switch connected between one terminal of potentiometer 46 and a source of bias potential schematically represented by the legend BIAS in Fig. 1. The other terminal of the bias source and the second terminal of potentiometer 46 are at ground potential. The purpose of switch 48 is to shift the zero of the meter by balancing out a selectable portion of the potential applied to the grid of tube 34 when an expanded scale is to be used.

A sensitive direct current meter 50 is connected to the cathode of electron tube 34 through a two-position switch 52. A second terminal of meter 50 is connected to a cathode of electron tube 38 through a two-position switch 54 and an adjustable series-multiplying resistor 56. A second adjustable series-multiplying resistor 58 may be connected in shunt with resistor 56 by the operation of two-position switch 60. Switch 60 is mechanically ganged to switch 48 so as to operate in synchronism therewith. By operating switches 48 and 60, either direct or expanded scale readings may be selected at the will of the operator.

A second position of switch 54 connects directly to ground the terminal of meter 50 formerly connected to the cathode of tube 38, while the second position of switch 52 connects the terminal of meter 50, formerly connected to the cathode of tube 34, to a source of reference voltage illustrated by block 62 through a series-multiplying resistor 61. Preferably, resistor 61 is so chosen that the indication on meter 50 will read directly in volts when meter 50 is connected across reference voltage source 62. Switches 52 and 54 are mechanically ganged as indicated by the dashed line so that they operate in synchronism. Again it should be obvious that the desired operation may be obtained by employing a conventional double-pole, double-throw switch to perform the function of switches 52 and 54. Switches 52 and 54 are provided so that meter 60 may be connected to read the amplitude of the potential supplied from source 62 or, alternatively, to read the potential difference existing between the cathodes of tubes 34 and 38 of the balanced direct current amplifier 39. The latter position is the position normally occupied by meter 50 when a reading of pulse amplitude is to be made.

The balanced direct current amplifier just described may include means for balancing the voltages at the cathodes of tubes 34 and 38, respectively, with zero signal on the grid of tube 34. However, such balancing means are well known in the art and have been omitted from Fig. 1 in order to simplify the drawing. A typical balancing circuit is shown in detail in Fig. 4 and will be described in detail later.

The reference voltage source 62 connected to switch 52 is also connected to a pulse clipping circuit 64 which is connected between the lowermost terminals of switches 18 and 22. Clipping circuit 64 clips or limits the amplitude of the pulses supplied to input terminals 16 precisely at an amplitude corresponding to the amplitude of the reference potential supplied from source 62. The clipped pulses serve as a reference standard in calibrating the meter circuit. No connection is made to the middle terminal of switch 18 and the middle terminal of switch 22 is returned directly to ground.

The physical positioning of the switches and adjustable potentiometers in an actual embodiment of the invention will vary depending upon the type of cabinet employed to house the meter circuit. For example, if the meter is to be mounted on a rack, all of the adjustable controls may be placed on the front panel where they are readily accessible. If the meter is designed for portability and a smaller cabinet is employed, space limitations and appearance considerations may dictate that some controls be placed on the front panel of the meter cabinet and that other controls be placed on a rear or bottom panel of the cabinet. Therefore it is impossible to suggest any single preferred arrangement of these circuit components. However, it is believed that a pictorial sketch of one possible arrangement will assist the reader in visualizing the invention and understanding the following description. For this reason reference should now be made to the pictorial sketch of Fig. 2 wherein the cabinet housing the meter circuit is shown at 70. Meter 50 is placed on an inclined face of the cabinet 70 to facilitate reading. A front panel of the cabinet 70 carries, from left to right, an On-Off switch, a Direct-Expanded Scale (Dir.-Exp. Scale) switch, a Reference Voltage-Meter (Ref. V.-Meter) switch, a Calibrate-Zero-Measure (Cal-0-M) switch, a pilot lamp 71 and input terminals 16. The On-Off switch is not shown in Fig. 1 but corresponds to switch 140 of Fig. 4. The Direct-Expanded Scale switch corresponds to switches 60 and 48 in Fig. 1 and switches 60, 48 and 137 in Fig. 4 and the Calibrate-Zero-Measure switch corresponds to switches 18 and 22 in Fig. 1 and to switches 18, 22 and 138 in Fig. 4. The Reference Voltage-Meter switch corresponds to switches 52 and 54 in Figs. 1 and 4.

The adjustable potentiometer controls may be located at the rear of cabinet 70 as shown in Fig. 3. These potentiometers are preferably provided with slotted or knurled shafts to facilitate adjustment of the potentiometers. The Coarse Zero control shown in Fig. 3 corresponds to potentiometer 106 in Fig. 4. The Fine Zero control refers to potentiometer 98 of Fig. 4. These two controls do not appear in Fig. 1. However, they form a part of the balancing circuit for amplifier 39 mentioned earlier in connection with the description of Fig. 1. The Expanded Scale Zero control provided by potentiometer 46 is labeled "Exp.-Zero" in Fig. 3. Adjustable potentiometer 56 corresponds to the Sensitivity control identified by the legend "Sen." in Fig. 3 and potentiometer 58 corresponds to the Expanded Scale Sensitivity control identified by the legend "Exp. Sen."

The circuit shown in Fig. 1 is placed in operation as follows. Assuming that all switches are in the positions shown in Fig. 1, switch 22 (Cal-0-M) is placed in the center (Zero) position, thereby grounding the input to cathode follower 26. The amplifier is adjusted by balancing means not shown in Fig. 1 but shown as Coarse Zero and Fine Zero in Fig. 3 so that meter 50 reads zero. The zero reading of meter 50 thus corresponds to zero input at terminal 16. The switch designations shown in parentheses correspond to the legends appearing in Figs. 2 and 3. Next, switches 52 and 54 (Ref. V-Meter) are placed in the left hand (Ref. V.) position shown in Fig. 1 which connects meter 50 and resistor 61 across the output of reference voltage source 62. The reading on meter 50 is noted. Switches 52 and 54 are then returned to the right hand (Meter) position shown in Fig. 1. Switches 22 and 18 are placed in the lowermost (Calibrate) position shown in Fig. 1. Signals applied at input terminal 16 are now applied through clipper 64 to the input of cathode follower 26. Clipper 64 is so constructed and arranged that the input pulses are clipped at a level corresponding to the voltage from reference source 62. Series resistor 56 (Sen.) is adjusted to cause the reading on meter 50 to correspond to the previously noted reading taken with meter 50 and resistor 61 connected across reference voltage source 62. When this adjustment has been made, the calibration of meter 50 for short duration pulses has been made to correspond to the calibration of the meter for direct potentials. The amplitude of the pulses from the capacitive voltage divider formed by capacitors 12 and 14 may now be measured by placing switches 18 and 22 in the uppermost (Measure) position as shown in Fig. 1, which eliminates clipper 64 from the circuit. It has been assumed that the amplitude of the pulses at input terminal 16 is larger than the voltage obtained from reference voltage source 62. This condition can be satisfied by adjusting the capacitive voltage divider or the reference voltage source 62. It has been assumed further that the calibration of meter 50 does not change with the amplitude of the signal applied to cathode follower 26. In practice, it has been found that this assumption is justified. It should be noted that the only external signal required for calibrating the meter is the signal to be measured. It should be noted further that there is no need to correct the calibration of the meter to take into account any differences in the waveshapes between a standard pulse and the pulses to be measured since the pulses to be measured become the standard pulses after passing through clipping circuit 64. Clipping circuit 64 merely changes the amplitude of the pulses without in any way changing the shape of the unclipped portions thereof. One further point should be noted. The accuracy of the calibration does not depend upon the knowledge of the amplitude of the potential supplied by source 62. The main requirement of source 62 is that it maintain a constant potential during the calibration interval. For this reason, some constant potential source external to the meter may be employed if desired. However, in preferred embodiments of the invention, the reference voltage source is included as an integral part of the meter circuit.

The method of calibrating pulse measuring circuits disclosed herein is particularly adapted for use in connection with the novel meter circuit just described but it is not limited to use with this circuit. This method may be successfully applied in the calibration of other meter circuits not equivalent to the ones herein shown, and hence the present invention embraces both the method of and the means for calibrating a meter circuit as herein disclosed.

The sensitivity of the meter circuit of Fig. 1 may be increased in any portion of its range by closing switch 60 and thereby placing resistor 58 in shunt with resistor 56. Increasing the sensitivity of the meter circuit will result in a corresponding expansion of unit increments on the scale of meter 50. Meter 50 is prevented from reading off scale by closing switch 48 (Dir.-Exp. Scale) and thus placing a bias voltage on the grid of tube 38. Closing switch 48 places the zero of meter 50 at some point other than zero input at cathode follower 26. For example, if meter 50 is graduated to read in units from zero to 100, the adjustable tap on resistor 46 (Exp.-Zero) may be set to cause meter 50 to read zero when a signal having an amplitude corresponding to 75 units is present at the cathode follower 26 and switch 48 is closed. Resistor 58 (Exp. Sen.) may then be set to increase the sensitivity of meter 50 by a selected factor, say 4, thus causing meter 50 to move from zero deflection to full scale deflection on a change from 75 to 100 units at the input of cathode follower 56. If desired, the tap on resistor 46 may be adjusted to cause meter 50 to read zero with signals at the input of cathode follower 26 corresponding to 50 units or 25 units. Meter 50 will then indicate to an expanded scale the regions from 50 to 75 units and 25 to 50 units respectively. Resistor 58 may be set to give other values of scale multiplication, for example 2 or 10. In fact resistor 58 may be made adjustable in steps to give several different values of multiplication. Similarly, potentiometer 46 may be adjustable in steps to give several different values of bias potentials so that any desired expansion of any portion of the scale may be selected at will.

Reference should now be made to Fig. 4 which illustrates in detail the complete circuit diagram of a meter designed to respond to negative pulses having an amplitude variation of 0 to 100 volts, a time duration of approximately 1 microsecond or greater and a repetition frequency of at least 10 pulses per second. Parts in Fig. 4 corresponding to like parts in Fig. 1 have been given corresponding reference numerals.

The signal to be measured is applied to coaxial input terminals 16 shown in the upper left hand corner of Fig. 4. The signal from input terminals 16 is applied through switches 18 and 22 and through coupling capacitor 72 and isolating resistors 74 and 76 to the grids of two vacuum tubes 78 and 80. Vacuum tubes 78 and 80 and associated circuit elements form the cathode follower 26 shown in Fig. 1. The anodes of vacuum tubes 78 and 80 are returned to a source of positive potential through a resistor-capacitor coupling filter 81—82. The cathodes of tubes 78 and 80 are connected together and returned to ground through cathode load resistor 84 and an inductor 86. Inductor 86 is provided to resonate with the stray capacitance unavoidably present between the cathode of tube 78 and 80 and ground in order that the time constant of the cathode circuit will be at a minimum. The grids of electron tubes 78 and 80 are returned to the cathodes through a resistor 88 having a resistance value large compared to resistors 74 and 76. Vacuum tubes 78 and 80 are operated in parallel in order to handle the large anode-to-cathode current resulting from the relatively low value of cathode load resistor 84 and the substantially zero grid-to-cathode bias of tube 78 and 80. In a circuit for measuring positive pulses, one of the two tubes may be omitted since the remaining tube will be biased approximately at anode current cut-off in the interval between pulses.

The signal from the cathodes of tubes 78 and 80 is applied, through a resistor-capacitor coupling network formed by capacitor 90 and resistor 92, to the cathode of a rectifier tube 94. Diode tube 94 is connected in series with a second diode vacuum tube 96 in order to reduce the effective capacitance of the rectifier circuit. It will be noted that the cathode-to-anode capacitances of tubes 94 and 96 are connected in series, thus giving an effective capacitance equal to one-half the capacitance of one of the tubes operating alone. The use of two tubes in series in this manner has been found to be highly desirable where pulses of the order of 1 microsecond in time duration are to be rectified. The anode of tube 96 is coupled to the long time constant resistor-capacitor circuit formed by capacitor 32 and resistor 36. The time constant of the charging circuit including tubes 94 and 96 and capacitor 32 is short compared to the duration of the pulse to be measured. Resistor 36 is connected to tube 34 as before.

A balancing network is provided in the D.-C. amplifier shown in Fig. 4 by connecting resistors 40 and 42 together through the winding of an adjustable potentiometer 98. The tap on potentiometer 98 is returned to ground through the series-parallel combination of resistors 102 and 104 and potentiometer 106. The grid of tube 34 is returned to the common junction of portions *a* and *b* of resistor 104 through the high impedance provided by resistor 108. A similar resistor 110 connects the adjustable tap of potentiometer 106 to the grid of vacuum tube 38. Two adjustable potentiometers are provided to give a fine and a coarse adjustment of the balance. Potentiometer 106 provides the coarse adjustment and potentiometer 98 provides the fine adjustment. The remainder of the balanced D.-C. amplifier is identical to the amplifier shown in Fig. 1 with the two exceptions that resistors 112 and 114 are connected in series with resistors 56 and 58 respectively in order to reduce the range of adjustment of resistors 56 and 58. Reducing the range of adjustment of these two resistors provides a corresponding increase of the sensitivity of adjustment. The second exception is that resistor 61 has been split into two parallel resistors 61*a* and 61*b*.

In the circuit shown in Fig. 4 the bias applied to potentiometer 46 is obtained from the same source as the reference voltages applied to switch 52 and clipper circuit 64. The reference voltage circuit consists of two series-connected rectifier tubes 116 and 118 having resistors 120 and 122 connected in shunt therewith as bleeder resistors. Two tubes are employed to increase the peak inverse rating of the rectifier, but a single tube may be employed if desired. The rectified voltage at the anode of tube 118 is supplied through a two-stage RC filter formed of capacitors 124 and 126 and resistors 128 and 130 to the cathode of a voltage regulator tube 132. The anode of regulator tube 132 is returned to ground. The characteristics of regulator tube 132 are such that a constant potential of approximately —90 volts is maintained at the cathode of this tube. The cathode of tube 132 is connected directly to switch 48 to provide the desired bias voltage. The reference voltage source just described is energized by the upper half of secondary winding 134 of a transformer 136. Connection is made to winding 134 through either of two switches 137 and 138. Switch 137 is closed when switches 60 and 48 are closed and switch 138 is closed when switches 18 and 22 are placed in the calibrate position. These switches are so connected that the negative power supply will be de-energized during the direct measuring operation when the negative potential supplied thereby is not required. The primary winding of transformer 136 is energized from a suitable source of alternating potential schematically illustrated by the convenience plug 139. An On-Off switch 140 is provided to control the energization of the meter circuit. An indicator lamp 71 and fuse 144 complete the primary circuit of transformer 136.

Secondary winding 134 also energizes a full wave rectifier tube 146 which supplies positive voltage to the cathode follower and D.-C. amplifier stages. The output of the positive voltage source is filtered by a three-stage RC filter composed of capacitors 148, 150, 152 and 154 and resistors 156, 158 and 160. The positive voltage is further stabilized by two series-connected voltage regulator tubes 162 and 164 connected in shunt with capacitors 152 and 154 respectively. The common cathode-anode connection of tubes 162 and 164 is connected to the junction point of series connected capacitors 152 and 154 in accordance with conventional engineering practice. The anode of voltage regulator tube 162 is connected directly to the anodes of tubes 34 and 36 and to the anodes of tubes 78 and 80 through the decoupling filter 81—82.

Diodes 166 and 168 form part of a two-stage clipper circuit corresponding to clipper circuit 64 shown in Fig. 1. Associated with diodes 166 and 168 are series resistors 170 and 172. A negative signal from the cathode of voltage regulator tube 132 is supplied directly to the anode of clipper tube 168. This negative potential is supplied to the anode of tube 166 through a resistor 174 and capacitor 176 which together form a decoupling filter. The time constant of the resistor-capacitor combination 174 and 176 is long compared to the time duration of the pulses to be measured and capacitor 176 is sufficiently large so that the voltage appearing thereacross does not change appreciably during the application of a pulse to be clipped. A two-stage clipper is highly advantageous for the following reason. It is desirable to keep the series resistance afforded by resistors 170 and 172 as low as possible in order that the time constant of the clipping circuit may be short compared to the duration of the pulses to be measured. Effective clipping action is generally provided by making the series resistance large compared to the resistance of the clipping diode. The same effect can be achieved by employing two clipping tubes in cascade with smaller series resistance for each tube. An additional diode tube 180, which has its anode connected to the terminal of switch 22 and its cathode returned directly to ground, is provided to clip any positive overshoot resulting from charging of stray capacitances in the clipping circuit. Tube 180 acts to clamp the input of the cathode follower circuit at zero in the interval between pulses when the clipper circuit is in operation. Appropriate values for the circuit elements shown in Fig. 4 may be selected by a worker skilled in the art once he fully understands the operation of the disclosed circuit. For this reason it is not necessary to limit the present invention to any specific values of circuit parameters, but, since circuit values are available which have been tested

Resistors

| | |
|---|---|
| 36 | 132 meg. |
| 40 | 15K. |
| 42 | 15K. |
| 44 | 117 meg. |
| 61a | 1.0 meg. |
| 61b | 20 meg. |
| 74 | 82 ohms. |
| 76 | 82 ohms. |
| 81 | 2K. |
| 84 | 50 ohms.–7 watt. |
| 88 | 3.3 meg. |
| 92 | 56K. |
| 102 | 10K—1 watt. |
| 104a | 1.8K. |
| 104b | 6.8K. |
| 108 | 10 meg. |
| 110 | 10 meg. |
| 112 | 33K. |
| 114 | 50K. |
| 120 | 12 meg. |
| 122 | 12 meg. |
| 130 | 33K. |
| 148 | 36K. |
| 156 | 170 ohms. |
| 158 | 2–470 ohms ea. in parallel. |
| 160 | 2–470 ohms. ea. in parallel. |
| 170 | 2.2K. |
| 172 | 4.4K. |
| 174 | 1K. |

Capacitors

| | Mf. |
|---|---|
| 32 | .0068 |
| 72 | .002 |
| 82 | 20 |
| 90 | .1 |
| 124 | 2 |
| 126 | 2 |
| 148 | 20 |
| 150 | 20 |
| 152 | .1 |
| 154 | .1 |
| 176 | .47 |

Potentiometers

| | |
|---|---|
| 46 | 2.5 meg. |
| 56 | 25K |
| 58 | 10K |
| 98 | 2.5K |
| 106 | 1K |

Tubes

| | |
|---|---|
| 34 | 12AU7 |
| 38 | 12AU7 |
| 78 | 6S4 |
| 80 | 6S4 |
| 94 | 5647 |
| 96 | 5647 |
| 116 | 6AL5 |
| 118 | 6AL5 |
| 132 | 5651 |
| 146 | 5V4 |
| 162 | OA2 |
| 164 | OB2 |
| 166 | 5647 |
| 168 | 5647 |
| 180 | 5647 |

Transformer 136

300–0–300 volts
90 ma.

Inductor 86

100 m. henry

Meter

0–100 μa. Simpson
Model 29

The procedure for placing the circuit of Fig. 4 in operation follows exactly the procedure for placing the circuit of Fig. 1 in operation. Reference should now be made to that portion of the description of Fig. 1 in order that the circuit of Fig. 4 may be fully understood.

The steps necessarily to modify the circuit to measure positive pulses will readily be apparent to a worker skilled in the art to which this invention relates. These steps include reversing the polarity of rectifier tubes 94 and 96 and the reference voltage source and supplying an appropriate bias potential to the cathode follower circuit.

Other changes and modifications may be made in the above-described circuits without departing from the true spirit and scope of the present invention. More particularly, numerous changes and modifications may be made in the circuits described above without in any way affecting the novel scale expanding and internal calibrating features of the present invention described in detail above.

What is claimed is:

1. In a measuring circuit, a balanced D. C. amplifier circuit comprising first and second electron tubes each having at least an anode, a cathode and a control grid, the anodes of said electron tubes being connected to a source of positive potential, first and second load resistors connected between the cathodes of said first and second electron tubes respectively and a point of reference potential, a serially connected meter and adjusable series-multiplying resistor connected between the cathodes of said first and second electron tubes respectively, means for applying a signal to be measured to the control grid of said first electron tube, means connected to the control grid of said second electron tube for supplying said control grid with a selectively alterable bias potential and means associated with said last-mentioned means and said serially connected meter and series-multiplying resistor for simultaneously altering the bias supplied to said grid of said second electron tube and the value of said series-multiplying resistor whereby the sensitivity of said measuring circuit is altered by a predetermined factor in a preselected portion of its range.

2. In a measuring circuit, a balanced D. C. amplifier circuit comprising first and second electron tubes each having at least an anode, a cathode and a control grid, the anodes of said electron tubes being connected to a source of positive potential, first and second cathode load impedances connected between the cathodes of said first and second electron tubes respectively and a point of reference potential, a meter and an adjustable series-multiplying resistor circuit connected in series circuit, said series circuit being connected between points on said first and second load impedances remote from said point of reference potential, means for applying a signal to be measured to the control grid of said first electron tube, a bias source having the same polarity output as the signal to be measured, means connecting said bias source to the control grid of said second electron tube, said last-mentioned connecting means including means for selectively altering the bias applied to said second grid, and means associated with said bias altering means and said adjustable series-multiplying resistor circuit for simultaneously increasing said bias and decreasing the resistance of said series-multiplying resistor circuit thereby to increase the sensitivity of said measuring circuit in a selected region within the range of said measuring circuit.

3. In a meter circuit, a balanced D. C. amplifier measuring circuit comprising first and second electron tubes each having at least an anode, a cathode and a control grid, the anodes of said electron tubes being connected to a source of positive potential, first and second cathode load resistors connected between the cathodes of said first and second electron tubes respectively and a point of reference potential, a series circuit comprising a meter, a first switch and a series-multiplying resistor circuit, the resistance of said series-multiplying resistor circuit being adjustable in steps by the operation of said first switch, said series circuit being connected between the cathodes of said first and second electron tubes, means for applying a signal to be measured to the control grid of said first electron tube, a bias source having the same polarity output as the signal to be measured, means including a second switch connecting said bias source to the control grid of said second electron tube, the bias applied to said last-mentioned control grid being adjustable in steps by the operation of said second switch, and means associated with said first and second switches for simultaneously actuating said switches thereby simultaneously altering the sensitivity and operating range of said measuring circuit.

4. In a pulse amplitude measuring device comprising a storage capacitor, means including rectifier means for supplying the pulses to be measured to said storage capacitor, a normally balanced D.-C. amplifier circuit having one input thereof coupled to said storage capacitor, means for indicating the degree of unbalance if any of said D.-C. amplifier circuit, the degree of unbalance being a measure of the amplitude of the signal supplied to said storage capacitor, a calibrating circuit comprising a clipping circuit constructed and arranged to limit the amplitude of pulses passing therethrough to a determinable amplitude, said determinable amplitude being lower than the amplitude of the pulses to be measured, means for selectively coupling said clipping circuit into a series relationship with said measuring circuit at a point anterior to said rectifier means and means for adjusting the sensitivity of said indicating means to cause said indicating means to indicate said determinable amplitude with said clipping circuit connected in series with said measuring circut.

5. In a pulse amplitude measuring device comprising a storage capacitor, rectifier means for supplying the pulses to be measured to said storage capacitor, a normally balanced D.-C. amplifier circuit including first and second similar cathode loaded electron tube amplifier stages, the input circuit of said first amplifier stage being connected across said storage capacitor, the input circuit of said second amplifier stage being connected across a source of fixed bias potential, a galvanometer and a first adjustable series-multiplying resistor connected in series between the load impedences of said two electron amplifier stages, said galvanometer indicating the unbalance if any of said D.-C. amplifier circuit, the degree of unbalance being indicative of the potential amplitude of the pulses to be measured, a calibrating circuit comprising a source of reference potential, a second series-multiplying resistor, means for selectively connecting said galvanometer and said second series-multiplying resistor across said source of reference potential to measure the amplitude thereof, a clipping circuit coupled to said source of reference potential, said clipping circuit being constructed and arranged to limit the amplitude of pulses passing therethrough to the amplitude of the potential supplied by said reference source, and means for selectively coupling said clipping circuit into a series relationship with said measuring circuit at a point anterior to said rectifier means, thereby causing a signal of known amplitude to appear across said storage capacitor.

6. In a pulse amplitude measuring device including means for generating a potential proportional in amplitude to the pulses to be measured and a meter circuit for measuring the amplitude of said generated potential, a calibration circuit comprising a source of reference potential, a pulse clipping circuit energized by said source of reference potential, said pulse clipping circuit being constructed and arranged to limit the amplitude of pulses passing therethrough to the amplitude of said reference potential, means for selectively interposing said clipping circuit between said potential generating means and the source of pulses to be measured and means for alternatively connecting said meter circuit across said potential generating means and said reference potential source to measure the respective potentials supplied thereby.

7. In a pulse amplitude measuring device including an input circuit, means for generating a potential proportional in amplitude to the amplitude of the pulses to be measured and a meter circuit for measuring the amplitude of said generated potential, a calibration circuit comprising a source of reference potential, a pulse clipping circuit energized by said source of reference potential, said pulse clipping circuit being constructed and arranged to limit the amplitude of pulses passing therethrough to a value proportional to the amplitude of said reference potential, a switch having at least first and second positions, said switch when in said first position connecting said input circuit directly to said potential generating means, said switch when in said second position connecting said input circuit to said potential generating means through said clipping circuit, and means for alternatively connecting said meter circuit across said potential generating means and said reference potential source to measure the respective potentials supplied thereby, the correction to be applied to the indications provided by said meter circuit being determinable from a comparison of the indications produced in response to said two measurements taken with said switch in said second position.

8. The method of calibrating a pulse amplitude measuring device of the type that includes means for generating a potential equal in amplitude to the pulses to be measured and a meter circuit for measuring the amplitude of said generated potential, said method including the steps of generating a reference potential of lower amplitude than the pulses to be measured, measuring said reference potential with said meter circuit, clipping said pulses to be measured at the amplitude of said reference potential, measuring with said meter circuit the substantially constant potential generated in response to said clipped pulses, and comparing the two measurements thus taken to determine the correction if any to be applied to indications provided by said meter circuit.

9. A pulse amplitude measuring device comprising an input circuit, means for generating a potential proportional in amplitude to the amplitude of pulses supplied thereto, a normally balanced direct current amplifier circuit including first and second similar cathode loaded electron tube amplifier stages, the input circuit of said first amplifier stage being connected across said potential generating means, a source of fixed reference potential, means connecting said source of fixed reference potential to the input circuit of said second amplifier stage, said last-mentioned means being adjustable to cause a selectable fraction of the potential supplied by said source of fixed reference potential to appear across the input circuit of said second amplifier stage, a galvanometer and a first adjustable series-multiplying resistor connected in series between the cathode circuits of said two electron amplifier stages, said galvanometer indicating the unbalance if any of said direct current amplifier circuit, a second series multiplying resistor, means for selectively connecting said galvanometer and said second series-multiplying resistor across said source of fixed reference potential to measure the amplitude of the potential supplied thereby, a clipping circuit coupled to said source of reference potential, said clipping circuit being constructed and arranged to limit the amplitude of pulse signals passing therethrough to a value proportional to the amplitude of said reference potential, and means for alternatively coupling said input circuit directly to said potential generating means and to said potential generating means through said clipping circuit, said last-mentioned connection causing a signal of known amplitude to be applied to the input circuit of said first electron tube amplifier stage, said first series resistor being adjustable to cause said galvanometer to indicate said known amplitude, said first series resistor also being adjustable to alter the sensitivity of said galvanometer by a preselected factor.

10. A device for measuring the amplitude of relatively short duration negative pulses, said measuring device comprising an input circuit, first switch means having at least first, second and third selectable positions, a cathode follower circuit, said cathode follower circuit including a resistor and an inductor in series in the cathode circuit thereof, said inductor being selected so as to resonate with the stray capacitance of said cathode circuit at frequencies present in said pulse signals, said switch when in said first position connecting said input circuit directly to said cathode follower circuit, said switch when in a second position connecting the input of said cathode follower circuit to a point of fixed reference potential, a storage capacitor, rectifier means connecting the output of said cathode follower circuit to said storage capacitor, a normally balanced direct current amplifier circuit including first and second similar cathode loaded electron tube amplifier stages, the input circuit of said first amplifier stage being connected across said storage capacitor, a source of fixed negative potential, a potentiometer, second switch means having at least first and second positions, said source of negative potential, said potentiometer, said switch and the input circuit of said second electron tube amplifier stage being so interconnected that operation of said second switch results in a predetermined change of bias applied across said last-mentioned input circuit, a potential measuring circuit connected between the cathode load impedances of said electron tube amplifier stages, said potential measuring circuit including a meter, third switch means, and a series-multiplying resistor circuit, said third switch means being so connected that the sensitivity of said potential measuring circuit is adjustable in predetermined steps by the operation of said third switch means, means for connecting said meter to said source of negative potential to measure the potential supplied thereby, a clipping circuit coupled to said source of fixed negative potential, said clipping circuit being constructed and arranged to limit the amplitude of pulses passing therethrough to the amplitude of the negative potential supplied thereto, said first switch means when in said third position connecting said input circuit to said cathode follower through said clipping circuit.

11. In a measuring circuit, a balanced D. C. amplifier circuit comprising first and second electron tubes, each having at least an anode, a cathode and a control grid, the anodes of said electron tubes being connected to a source of positive potential, first and second cathode load impedances connected between the cathode of said first and second electron tubes respectively and a point of reference potential, a meter circuit including means for adjusting the sensitivity thereof connected between the points on said first and second load impedances remote from said point of reference potential, means for supplying a signal to be measured to the control grid of said first electron tube, a bias source having the same polarity output as the signal to be measured, means connecting said bias source to the control grid of said second electron tube, said last-mentioned connecting means including means for selectively altering the bias applied to said grid of said second electron tube, and means associated with said bias altering means and said meter circuit sensitivity adjusting means for simultaneously increasing said bias and increasing the sensitivity of said meter circuit thereby to increase the sensitivity of said measuring circuit in a selected region within the range of said measuring circuit.

12. A pulse amplitude measuring device comprising an input circuit, means for generating a potential proportional in amplitude to the amplitude of pulses supplied thereto, a normally balanced direct current amplifier circuit including first and second similar cathode loaded electron tube amplifier stages, the input circuit of said first amplifier stage being connected across said potential generating means, a source of fixed reference potential, means connecting said source of fixed reference potential to the input circuit of said second amplifier stage, said last-mentioned means being adjustable to cause a selectable fraction of the potential supplied by said source of fixed reference potential to appear across the input circuit of said second amplifier stage, a galvanometer circuit, including means for adjusting the sensitivity thereof, connected between the cathode circuits of said two electron tube amplifier stages to indicate any unbalance of said direct current amplifier circuit, said sensitivity adjusting means being adjustable to alter the sensitivity of said galvanometer by a preselected factor, a second source of fixed potential, means for selectively connecting said galvanometer circuit to said second source of fixed potential to measure the amplitude of the potential supplied thereby, a clipping circuit coupled to said second source of fixed potential, said clipping circuit being constructed and arranged to limit the amplitude of pulse signals passing therethrough to a value proportional to the potential supplied by said second source, and means for alternatively coupling said input circuit directly to said potential generating means or to said potential generating means through said clipping circuit, said last-mentioned connection causing a signal of known amplitude to be applied to the input circuit of said first electron tube amplifier stage.

13. A pulse amplitude measuring device comprising an input circuit, means for generating a potential proportional in amplitude to the amplitude of pulses supplied thereto, a normally balanced direct current amplifier circuit including first and second similar cathode loaded electron tube amplifier stages, the input circuit of said first amplifier stage being connected across said potential generating means, a source of fixed reference potential, means connecting said source of fixed reference potential to the input circuit of said second amplifier stage, said last-mentioned means being adjustable to cause a selectable fraction of the potential supplied by said source of fixed reference potential to appear across the input circuit of said second amplifier stage, a galvanometer circuit, including means for adjusting the sensitivity thereof, connected between the cathode circuits of said two electron amplifier stages to indicate any unbalance of said direct current amplifier circuit, means for selectively connecting said galvanometer circuit to said source of fixed reference potential to measure the amplitude of the potential supplied thereby, a clipping circuit coupled to said source of reference potential, said clipping circuit being constructed and arranged to limit the amplitude of pulse signals passing therethrough to a value proportional to the amplitude of said reference potential, and means for alternatively coupling said input circuit directly to said potential generating means or to said potential generating means through said clipping circuit, said last-mentioned connection causing a signal of known amplitude to be applied to the input circuit of said first electron tube amplifier stage, said galvanometer circuit sensitivity adjusting means being adjustable to cause said galvanometer to indicate said known amplitude, said sensitivity adjusting means being further adjustable independently of said first adjustment to alter the sensitivity of said galvanometer by a preselected factor.

14. A balanced amplifier measuring circuit comprising first and second substantially identical amplifier stages, each including a load impedance and an electrode-controlled variable impedance element serially connected across a source of potential, means for supplying the signal to be measured to the control electrode of said variable impedance element in said first amplifier stage, a source of reference signal coupled to the control electrode of said variable impedance element in said second amplifier stage, the amplitude of said reference signal being independent of the amplitude of the signal to be measured, a meter circuit connected between the junction of said load impedance and said variable impedance element in said first amplifier stage and the corresponding point in said second amplifier stage, said meter circuit including at least a meter and means for adjusting the sensitivity of said meter circuit to signals supplied to the terminals thereof, and means associated with said source of reference signal and said meter circuit sensitivity adjusting means for simultaneously altering the amplitude of said reference signal and the sensitivity of said meter circuit.

15. A balanced amplifier measuring circuit comprising first and second substantially identical amplifier stages, each including an input to which a signal may be supplied, means for supplying the signal to be measured to said input of said first amplifier stage, a source of reference signal coupled to said input of said second amplifier stage, the amplitude of said reference signal being independent of the amplitude of the signal to be measured, a meter circuit connected between corresponding ungrounded points in said two amplifier stages, said meter circuit including at least a meter and means for adjusting the sensitivity of said meter circuit to signals supplied to the terminals thereof, and means associated with said source of reference signal and said meter circuit sensitivity adjusting means for simultaneously altering the amplitude of said reference signal and the sensitivity of said meter circuit thereby to alter simultaneously the sensitivity and operating range of said measuring circuit.

16. In a measuring circuit, a balanced amplifier circuit comprising first and second substantially identical amplifier stages, each including an electron tube having an anode, a cathode, a control grid and a load impedance connected in the cathode circuit thereof, a source of anode voltage associated with said two amplifier stages, means for supplying the signal to be measured to the control grid of said tube in said first stage, a source of reference signal coupled to said control grid of said tube in said second stage, a meter circuit connected between the cathode of the electron tube in said first stage and the corresponding point in said second stage, said meter circuit including at least a meter and means for adjusting the sensitivity of said meter circuit to signals supplied to the terminals thereof, and means associated with said source of reference signal and said meter circuit sensitivity adjusting means for simultaneously altering the amplitude of said reference signal and the sensitivity of said meter circuit thereby simultaneously to alter the sensitivity and operating range of said measuring circuit.

References Cited in the file of this patent

UNITED STATES PATENTS

| | | |
|---|---|---|
| 2,316,044 | Blair | Apr. 6, 1943 |
| 2,320,175 | Dennis et al. | May 25, 1943 |
| 2,324,215 | Kinsburg | July 13, 1943 |
| 2,360,523 | Simmons | Oct. 17, 1944 |
| 2,423,263 | Sprague | July 1, 1947 |
| 2,453,958 | Andersen | Nov. 16, 1948 |
| 2,493,336 | Burger et al. | Jan. 3, 1950 |
| 2,498,103 | Wojciechowski | Feb. 21, 1950 |
| 2,544,226 | Herold | Mar. 6, 1951 |
| 2,552,348 | Shapiro et al. | May 8, 1951 |
| 2,676,300 | Hirsch et al. | Apr. 20, 1954 |